(12) United States Patent
Daniel et al.

(10) Patent No.: US 6,766,301 B1
(45) Date of Patent: Jul. 20, 2004

(54) FRAUD DETERRED PRODUCT AND SERVICE COUPONS

(76) Inventors: Mike Daniel, 1925 Century Park East Suite 1150, Los Angeles, CA (US) 90067; Duncan Lee, 1400 E. Garcia Pl., Placentia, CA (US) 92870

( * ) Notice: Subject to any disclaimer, the term of this patent is extended or adjusted under 35 U.S.C. 154(b) by 0 days.

(21) Appl. No.: 09/513,963

(22) Filed: Feb. 28, 2000

(51) Int. Cl.[7] .............................................. G06F 17/60
(52) U.S. Cl. ..................... 705/14; 235/380; 235/492; 235/379; 235/381; 705/26; 705/27
(58) Field of Search .............................. 705/14, 26, 27; 235/380, 379, 381, 492

(56) References Cited

U.S. PATENT DOCUMENTS

| | | | | |
|---|---|---|---|---|
| 6,035,280 A | * | 3/2000 | Christensen | .................. 186/52 |
| 6,321,208 B1 | * | 11/2001 | Barnett et al. | ................. 705/14 |
| 6,334,108 B1 | * | 12/2001 | Deaton et al. | ................. 705/14 |
| 6,505,773 B1 | * | 1/2003 | Palmer et al. | ............... 235/380 |

FOREIGN PATENT DOCUMENTS

WO  WO 97/23838  * 7/1997 ........... G06F/17/60

OTHER PUBLICATIONS

Rob Wells, "Citibank Cards Come With Rebates", Philadelphia Inquirer: Apr. 2, 1991.*

* cited by examiner

Primary Examiner—Eric W. Stamber
Assistant Examiner—Jean David Janvier
(74) Attorney, Agent, or Firm—Maria Erlinda Co Sarno

(57) ABSTRACT

A membership user coupon program for printed and electronic coupons having built-in measures to deter fraud committed by a retailer and/or a consumer during the redemption and/or reimbursement of the coupon. The system and process provide traceability prior to the issuance and/or printing of the coupon, prior to a retailer acceptance of the coupon and at the point of sale.

10 Claims, 6 Drawing Sheets

FRAUD DETERRED PRODUCT AND SERVICE COUPONS

BACKGROUND

More and more consumers are shopping "online", that is through the Internet, because of convenience, wider selection and most of the time, better pricing. Internet is synonymous to a global computer network. This type of marketing has cut the cost of the middlemen. This method of marketing is also favorable to the manufacturers and service providers because they can sell directly to the consumers and retailers without the need of distributors and nation wide warehouses. This increase in online purchasing of goods and services, herein collectively referred to as products, has also created the need for electronic coupons which are provided by manufacturers and service providers to consumers as marketing incentives. Manufacturers and service providers, are also herein collectively referred to as providers. Electronic coupons are similar to the traditional paper printed coupons which are submitted by consumers when purchasing a particular good or service in exchange for a monetary discount in price or a rebate except that electronic coupons are retrieved and/or printed online by consumers and retailers, herein also referred to as users. These coupons typically contain product information, the coupon amount, expiration date, and in some, transaction data such as the number of allowable coupon per user and the total number of coupons allowed for a given promotion, herein also referred to as certificate marks. These certificate marks may be accompanied by other identification data which are printed in numbers, letters, bar codes, combination of these, or other symbols that uniquely identify each coupon, herein also referred to as identification mark.

Printed coupons have been faced with both retailer and consumer fraud, referred to as coupon fraud, which have necessitated the additional printing of unique certificate and identification marks. The exact percent of coupon frauds related to traditional newspaper printed coupons is unknown, because there are only primitive techniques available to suspect potential frauds, with very limited tools and audit trail to isolate the fraudulent activities. Some experts have stated that coupons frauds are about 25%, and most agree that retailer coupon frauds are significantly more of a concern than consumer coupon frauds.

Electronic coupons are expected to experience the same or even greater coupon fraudulent practices because of the convenience of printing several copies of the coupon online by a user. This fear of influx of consumer and retailer coupon fraud have created some resistance in adapting electronic coupons among providers especially those that produce and sell high priced merchandise. Golden, et al. in U.S. Pat. No. 5,761,648 attempted to address this issue by providing an online coupon issuing service which identifies and marks each electronic coupon or certificate with a code distinguishing a particular certificate from all other certificates, referred to as unique certificate mark and another code identifying the user, referred to as unique identification mark. In addition, the data processing system within the online coupon issuing service, limits the total number of certificates to be issued, as well as the number of certificates to be issued to each individual and makes these actual transactions of printing the certificates by the users available in a report form. While the system of Golden prevents some form of coupon fraud, it is ineffective because its traceability ends at the point of printing the coupon. The system of Golden does not provide an efficient system for tracing whether or not an actual use of the product coupon occurred at the point of sale where most of coupon fraud occur. More specifically, the system does not provide an audit trail for tracing a particular sale transaction to a validated sale by a validated consumer. While providing a PIN (personal identification number) identifies a consumer/user and if set-up to do so, the demographics of such user as to location of sale, etc., such security measures only ensure that the coupon is valid and was issued to a consumer/user having an issued PIN. There are no built in safeguards prior to the issuance of a PIN number such as verifying that such consumer is not a fictitious person, that is, it does not tie the provided information such as a credit card number to the database of the credit card issuer or if a bank checking account is provided instead of a credit card, to an issuing bank. Additionally, even if issuance of the PIN is verified with the credit card issuer or the personal check to an issuing bank, a retailer can still gather these legitimate coupons, submit these to the provider for reimbursement without having an actual sale transaction take place. Scanning a coupon before credit deduction from the consumer's bill only protects the retailer in ensuring the validity of the coupon. The PIN does not address the issue when it is the retailer that commits the coupon fraud as stated above. Further, the system of Golden is inapplicable to the traditional paper printed coupon.

A retailer coupon fraud is commonly committed by a retailer submitting several providers' coupon to the provider for reimbursement on non-bonafide sales or fictitious purchases. A coupon that has unique markings, such as that proposed by Golden, will not deter retailer coupon fraud because a retailer can just gather several of these coupons, submit them to the provider and get the reimbursement without having to link such coupons to actual sale transactions. Consequently, a provider will experience a loss by reimbursing the retailer without getting the benefit of generating the revenue from an actual sale of the product, as well as a loss of an opportunity for generating a potential repeat customer or consumer by the retailer hoarding such coupons. Combining the unique certificate mark with the unique identification mark, as proposed by Golden, does not provide a solution to the problem because a retailer can ask several living individuals and fictitious individuals to print these electronic coupons and submit these to the providers without requiring these individuals to actually buy the product.

A consumer coupon fraud is usually committed by unauthorized copying of the product coupon, counterfeiting, unauthorized tampering of the value and expiration date of the coupon, unauthorized creation of a special promotion and by printing or getting several coupons which a consumer or a single household uses by going back and forth to a store or several stores to purchase the same specified product that is, doing multiple redemption of the coupon. The latter type of consumer fraud is usually of a lesser monetary loss to a provider. However, these type of fraud is rampant and often ignored by a retailer. The providers experience loss by defeating the purpose of the coupon, that of promoting the product through the issuance of a discount coupon, as an incentive for the consumer to try the product at the discounted rate. Because these coupons are provided in limited quantity and usually for a limited time, the use of several of these coupons by one consumer prevents the provider from reaching a greater number of consumers belonging to different households. Golden et al. deters only the copying of the product coupon through the printing of a unique identification mark for each certificate or coupon. However, like the retailer coupon fraud, the unique marks do not deter the printing of several legitimate coupons by as many members of a household, not ignoring the potential for the same household using fictitious users to print more coupons. One household can potentially print a sizeable percentage of the total allowable coupons thereby minimizing the widespread distribution of these coupons.

The present invention addresses both the retailer and consumer fraud by providing traceability prior to the issuance and/or printing of the coupon, prior to a retailer acceptance of the coupon and more importantly, traceability of the product coupon at the point of sale. The system places value on consumer validation, and educates the industry to enforce the necessity and policy of only accepting traceable purchases by credit card, smart card, cash card and the like, collectively referred herein as credit card, or by personal check, for all types of coupons. Utilizing the claimed invention provides the necessary audit trail that enables the providers to aggressively deter and reduce both types of coupon frauds, and additionally provide the required evidence to prosecute retailers for their criminal activities, if desired. The system generally accomplishes this by requiring consumer membership prior to issuance of the coupon, limiting the sale to credit card or check payment, that is, no cash purchase is allowed with coupon redemption, and requiring or providing user validation and verification at the point of sale with an actual sale reported or transmitted to a database having a traceable retailer file or if applied to a traditional paper printed coupon or third party coupons, a proof of sale imprinted on the coupon. Imprinting may be done manually or electronically through a printer.

It is an object of this invention to provide both printed and electronic coupons that are traceable at the point of sale thereby deterring and reducing both retailer and consumer fraud.

It is also an object of this invention to provide a system for using traditional paper coupons and current electronic coupons with or without printed unique identification marks by implementing the security devices of this invention.

SUMMARY OF THE INVENTION

The issuance and printing of manufacturing coupons with certificate marks, and/or identification marks and/or encrypted security marks are known. Online printing by users of coupons, referred to as electronic coupons, the coupons bearing information or data supplied by the manufacturer or a service provider, is also known. See U.S. Pat. Nos. 5,907,830; 5,761,648; and, 5,305,197 as examples. These on line processes generally involves a provider or a provider with a service center, the service center herein also referred to as coupon issuer, in electronic communication with each other, generating providers' coupons for users' perusal and storing these in a data base ready to be printed by an interested user. Current or known coupons generally contain the product information, amount of the coupon, expiration date and optionally, marketing data, identification information and security codes to uniquely identify the user and/or the promotion for verification on the authenticity of the respective coupons. Although the claimed invention proposes its own unique provider coupon and its method/s of issuance, printing and redemption of these coupons, all of these current or known coupons issued on line or paper printed and the processes for generating these can be modified and adapted to any one of the processes of the claimed invention to deter or reduce coupon fraud. The present invention provides a system for deterring and reducing coupon fraud by building in security measures both in the process and in the printed coupon.

The invention utilizes an interactive online database system, herein referred to as IODS, which operates on a membership basis where users are validated and each given an identification number or mark. An interactive online database system used in this invention is a sophisticated combination of three subsystems all working together to perform the different operations or process steps described by the different claimed methods.

A method for registering a first time coupon user as a member consumer/user into the coupon program described herein comprise the steps of entering a prescreening information such as a unique user name, a password and any other information requested by a service center or a provider to an interactive selection by the member consumer/user. A registered member of the IODS enters 32 his/her user name also referred to as assigned identification mark and password for verification 33 by the IODS 1. Once verified for its validity, the IODS 1 will issue 34 a unique coupon 25 preferably with an encrypted serial number to the member consumer/user's remote user computer terminal 6, so that the coupon 25 may be printed 35 immediately or retrieved a second time from the service center 22, if the original printed coupon was lost or damaged, and printed on the member consumer/user's printer device 49 (not shown). The service center will issue a substitute identical coupon as the original for lost or damaged coupon to enable traceability if the member consumer/user has used the original coupon because the duplicate usage will be identified and detected once the original and the substitute coupons are scanned. Validity criteria are the same as the above real time online process. In a paper printed coupon, the above steps are accomplished with the distribution of the providers' coupons through known marketing media. If the user name and/or password is not valid, the member consumer/user is advised by the IODS 1 to contact 36 the provider or service center representative. The member consumer/user brings the provider coupon 25 to a retailer/user 40 and upon presentation 50 of the coupon 25 for a card payment, the retailer matches the name in the coupon with the name on the credit card, personal bank check or any other valid form of identification, punches in or enter 51 the amount of the sale and requests the user to make his/her payment by sliding his/her credit card for payment validation by the card provider. For payment by a personal bank check, the check is validated by a member consumer/user presenting a picture identification such as a valid driver's license to the retailer/user and by writing 52 the personal bank account and/or check number on the provider's coupon 25. The check number written on the coupon will be the retailer's proof of the purchase. The retailer/user 40 gathers 53 all the validated provider coupons 25 received, and forwards 54 these by mail or shipment with his retailer identification number or other forms of identification to the provider 16 or service center 22 whose address is printed on the coupon, or to a selected retail clearing house selected by the retail store to sort and ship 54 these coupons 25 for them. The coupon 25 must be returned to the appropriate service center 22 for coupon scanning, decoding, and validation. Upon acceptance by the service center 22, The IODS 1 will download 55 the most recent copy of the coupon database and activity into a scanning system 9 which will scan, decode, validate and record 56 each coupon 25, the good coupons will be counted 58 and any coupons that were tampered, falsely created, or photocopied will be identified and recorded 59. After completion of every submission, accounting and verification of all coupons submitted by a retailer, the IODS 1 database is updated. The latest retailer redemption activity will be documented 60 in a coupon validation report. The coupon validation report, along with the physical coupon received by the service center, will be forwarded 61 to the provider or its agent who will review 62 the coupon validation report and reimburse 63 the retail store for the member consumer/user submitted coupons. For any anomalies, the provider may choose to audit 64 the retail store for potential coupon fraud. This audit trail, made possible by using an IODS, allow the product and service providers to isolate the cause of fraud, and therefore deter and reduce future coupon fraud by the users.

The use of providers coupon covered by the claimed invention may be accomplished in several ways. One method is done purely online and on real time basis resulting in a paperless transaction, another methods is a combination of online and manual operation while the other method covers the adaptation of an existing third party paper or electronic coupon to the methods of the claimed invention. A method for online, real time coupon issuing and redeeming of a desired provider coupon by a member consumer/user, comprise the steps of entering a resident zip code of the member consumer/user to an interactive online database system of a service center or a provider; displaying available provider coupons for the member consumer/user by the interactive online database system; selecting a provider coupon or coupons from the available coupons by the member consumer/user; entering a service center assigned identification mark or user name and a member consumer/user password into the interactive online database system, the interactive online database system checking its database to verify the assigned identification mark and password, tying the assigned mark and password to the member consumer/user, determining a number of times the member consumer/user has requested the selected provider coupon, approving or disapproving the member consumer/user request for the provider coupon and allowing the issuance of the provider coupon, the issued coupon tied to a member consumer/user identification mark and password; transmitting the provider coupon with a product order by the member consumer/user to a retailer's computer; entering a sale or a plurality of sale of a product by a retailer; validating payment of the sale by a credit card or a bank check; forwarding a sale confirmation number and retailer identification number to the service center; recording the sale to the retailer by the service center; crediting the retailer with an amount specified on the provider coupon; reimbursing the retailer of the credit at a time specified by the provider; and, updating the interactive online database after each reimbursement of the retailer.

For coupon issuance and redemption at a retailer without online, real time connection with an interactive online database system of a service center and a payment center, a hybrid method of online and manual operation, the method comprises the steps of entering a resident zip code of a member consumer/user to an interactive online database system of a service center or a provider; displaying available provider coupons for the member consumer/user by the interactive online database system; selecting a provider coupon or coupons from the available coupons by the member consumer/user; entering a service center assigned identification mark or user name and a consumer/user password into the interactive online database, the interactive online database checking its database to verify the assigned identification mark and password, tying the assigned identification mark and password to the member consumer/user, determining a number of times the member consumer/user has requested the provider coupon, approving or disapproving the member consumer/user and allowing the issuance of the provider coupon, the issued coupon tied to a member consumer/user identification mark and password; printing the provider coupon by the member consumer/user; bringing and presenting the provider coupon by the member consumer/user to a retailer; entering a sale or a plurality of sale of a product by the retailer; validating payment of the sale by a credit card or a bank check; forwarding a number of gathered validated provider coupons generated from the sale or plurality of sale of the product to the service center; scanning, decoding and validating the provider coupons forwarded by the retailer; identifying fraudulent coupons from legitimate coupons; preparing a provider coupon validation report by the service center; forwarding the coupon validation report and the gathered provider coupon to the provider; reviewing the coupon validation report by the provider; and, reimbursing the retailer for the amount of the desired coupons. The IODS is updated after each reimbursement of the retailer.

A preferred provider's coupon proposed by the claimed invention for used with the above claimed methods includes aside from the product information, the following information: name of the member consumer/user and the name of the spouse, if requested, e-mail address, date of issuance or printing of the coupon, a blank space to fill in date of purchase, a blank space to write in the initial of the member consumer/user, a blank space to write in the personal account and/or check number if paying by check, coupon value, expiration date, sales order number, provider's barcode, unique membership identification number, instructions to cashier to check identification and to accept purchases only with a credit card payment method or by personal check, mailing address of the administrator for the service center or provider where the retailer can submit used member consumer/user coupons for reimbursement and a unique encrypted serial number, if desired. The printing of the member consumer/user name in the provider's coupon is a must for the hybrid method to enable the security measures. This enables the retailer to match the name of the member consumer/user with the name on the credit card or bank check to prevent consumer fraud. The service center certification mark generally includes sales order number, coupon value, expiration date, provider's barcode, instructions, mailing address of administrator and the date of issuance or printing of the coupon. The service center identification mark general includes the member customer/user name, e-mail address, unique membership identification number, date of purchase, customer's initials, personal check number, and optionally, a unique encrypted serial number.

For electronic coupons, all of the preferred information can be easily printed on the provider's coupon much like a personal check. For third party coupons without the above printed information on the coupon and for those issued by other than the system herein, these may be used by separately entering, punching in, and imprinting the above preferred information by the IODS at the point of sale using the retailer's remote terminal, such as an electronic card programmer, once a consumer/user agrees to sign up for membership which follows the same membership application process as described above. A member consumer/user can also use third party coupons and need not sign up again for membership.

For current printed and online third party generated provider coupons, collectively referred to as third party coupon, the method of issuance and reimbursement of these coupons comprise the steps of bringing and presenting the third party coupon by a consumer/user to a retailer; scanning the third party coupon by the retailer; signing up for membership by the consumer/user; entering a service center assigned identification mark and a consumer/user password into an interactive online database of a service center or a provider, the interactive online database checking its database to verify the assigned identification mark and password, tying the assigned mark and password to the member consumer/user, approving or disapproving the use of the third party coupon by the member consumer/user; entering a sale or a plurality of sale of a product by the retailer; validating payment of the sale by a credit card or a bank check; imprinting a service center certificate and identification marks on a surface of the third party coupon; forwarding a number of gathered imprinted third party coupons generated from the sale or plurality of sale of the product to the service center; scanning, decoding and validating of the third party coupons forwarded by the retailer; identifying fraudulent coupons from legitimate coupons; preparing a coupon validation report by the service center; forwarding the coupon validation report and the gathered third party coupon to the provider; reviewing the coupon validation report and the imprinted third party coupons by the provider; and, reimbursing the retailer for the amount of the desired coupons.

In the above methods, if allowed by the provider, the retailer can also be the consumer, in which case the same identification mark or user name is entered for the issuance of the coupon and for crediting the coupon amount which the provider later reimburses. These methods provide an audit trail which verifies a user, prevents a consumer/user from printing or using the same coupon beyond the allowable number for each user, requires a verifiable purchase, and credits the retailer/user only with verified purchases.

With this system, a counterfeit coupon will not hurt the provider because there is an internal check for the number of usage and more importantly, credit is given only after a bonafide purchase. In lieu of on line real time check approval, payment by check can be validated by a member consumer/user presenting a picture identification such as a valid driver's license to the retailer/user.

DETAILED DESCRIPTION OF THE INVENTION

Figure 1:
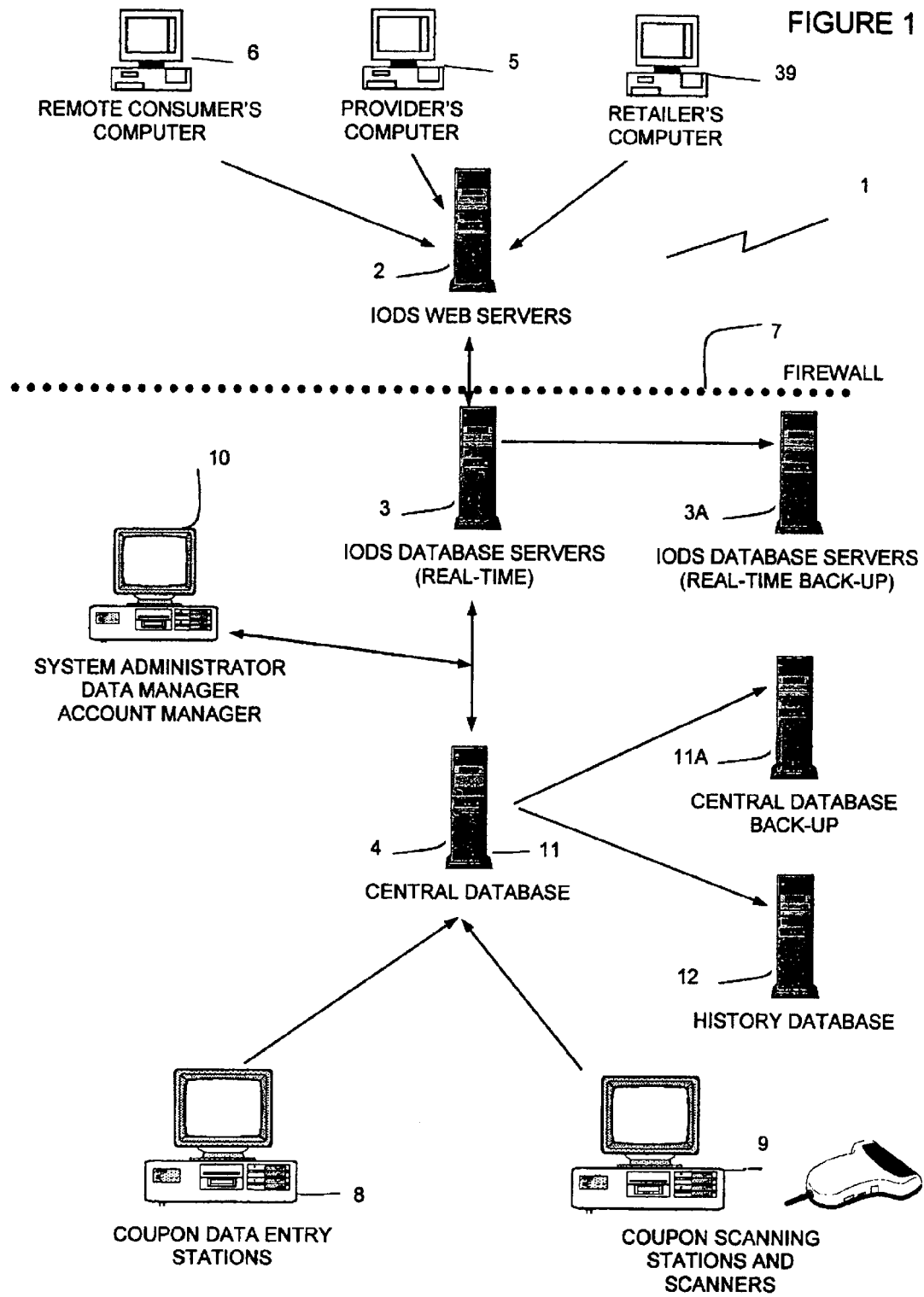
FIG. 1 is a hardware schematic of the coupon issuance and redemption system.

The fraud deterred coupon issuance and redemption system utilizes an interactive online database system 1, IODS as shown in FIG. 1, which is a sophisticated combination of three subsystems, the Internet web site programs and IODS web servers 2; the database programs and IODS database servers 3; and, servers 4 for the various work stations programmed to perform the respective work station's specific operations or tasks. The Internet web site program is a user friendly interface web site program designed and developed to allow users, providers and retailers and visitors to interact with and obtain information from the IODS database server, display information and data, enable the online membership sign-up or registration process, selection of coupon and viewing the history of coupon issuance and printing. The database program, like any database program, allows input, storage and output of data. It can operate on the data such as encryption and auto-numbering, and maintain a data history on the status of the accounts, sales order, performance of each promotion and the issuance and redemption of the coupons. The work station programs, ran on server 4, manages the specific functions of the work station in a level of desired security. The functions of the work stations include but is not limited to enter, scan, validate, store, approve, disapprove, archive, process and present data related to the verification of a coupon, a retailer or a consumer. These subsystems all work together to input or enter data, retrieve data, store data, create data, code and decode data, encrypt data, secure data, analyze data, process data, validate data, verify data, record and report data, display data, match data, update data, provide printable data, control access of data, for the providers, member consumer/user, and retailer/users, these functions used, integrated and identified in the claimed methods. The IODS 1 can be adapted to connect with as many remote terminals as needed to allow interactive communication between the various terminals and the IODS. The interconnection is preferably done through a modem to a commercial source for accessing a network, such as the Internet, using a browser or by direct access from a bulletin board system. However, other means of connection such as through fiber optics, other electrical types of connection or wireless methods may be employed. While the IODS is designed to be able to communicate without restrictions with the remote terminals, the IODS 1 discriminates and limits accessibility of the individual terminals to the data stored within the IODS as well as limits accessibility of one terminal to access data stored in another terminal. The IODS 1 is set up to allow the interaction between the provider's computer 5 with the web server 2 so that the provider can input, view and secure data from the IODS database server 3. The IODS system administrator 10 controls all updates and activities of the system and confirms and validate the data coming from the provider's computer 5 before it is made available for display to the member consumer/user's computer 6. All IODS database servers, work stations, network of computers and accessories are secured behind a firewall 7. The work stations generally are the data entry stations 8 for inputting data about the member users and providers; and, the coupon scanning and validation processing stations 9 which collect the data on the returned coupons. All data entry, coupon scanning and validation of returned coupons are carefully validated by the system administrator 10 before they are uploaded to the central database 11 within server 4. At a selected period of time, the administrator 10 validates the data in the central database before it is fed to the IODS database server 3. A history database 12 archives outstanding coupon data to reduce the database size on all the database servers and their back-ups. Both the IODS database server and the central database server are backed up by real time mirror servers 3A and 11A, respectively.

The security measures built into the claimed process require that a user should first register as a member/user of the user coupon program described herein.

A. Consumer/User Validation Process

Figure 2:
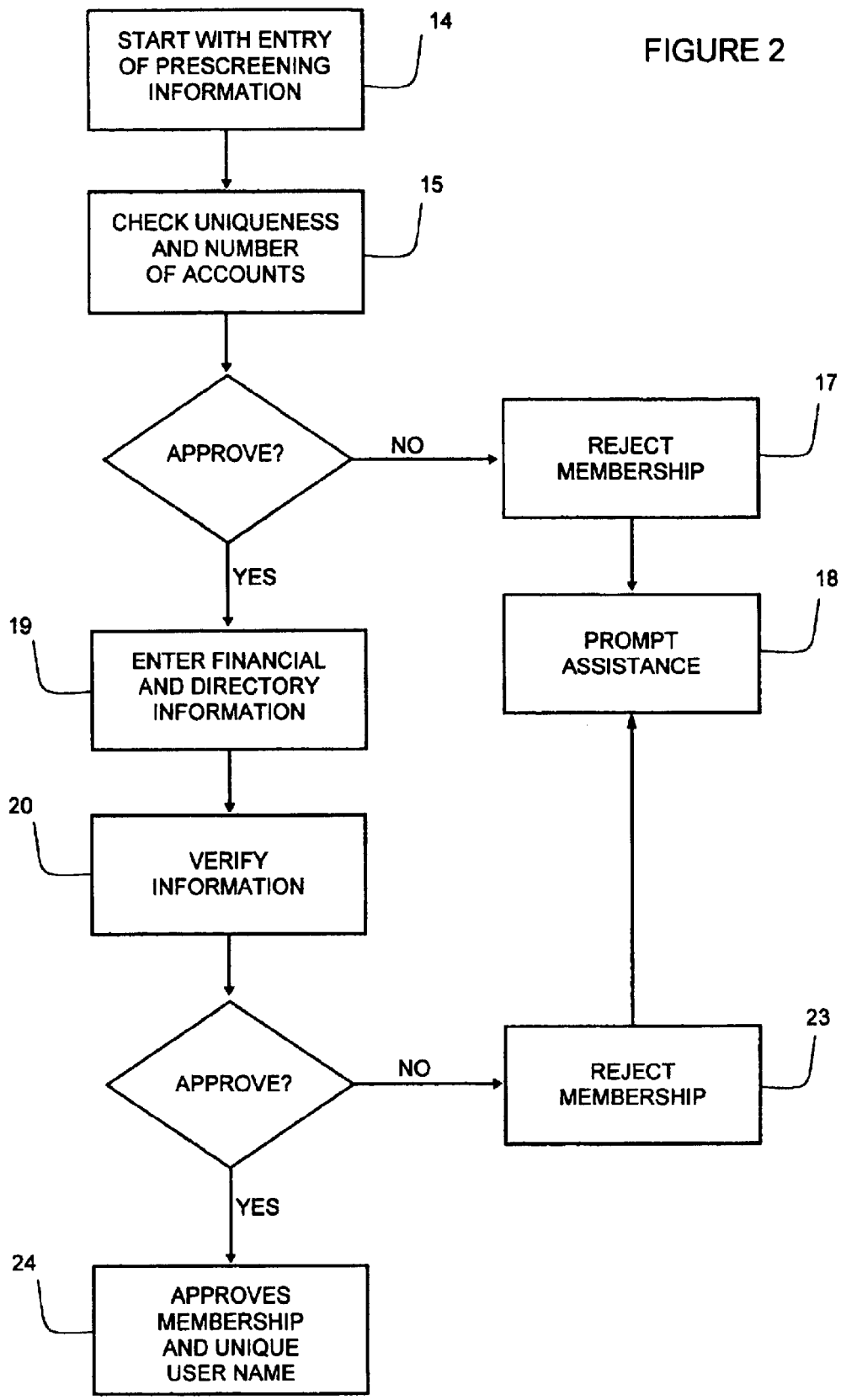
FIG. 2 is a schematic view of the membership process.

A first time consumer/user 13 (not shown) who wants to become a registered member as shown in FIG. 2, must enter in 14 from his/her user terminal or computer 6, a prescreening unique user name, a password, and any other requested information, collectively referred to as prescreening information, to a provider 16 (not shown) or service center 22 (not shown) having the IODS 1. If the user name selected is unique, the IODS 1 preferably, will check 15 the consumer/user's computer 6 to determine the number of registered accounts created from the same computer 6, usually traced by its e-mail address, using for example, a serverlet cookie technology. If the number of existing accounts created exceeds the limit of accounts per terminal allowed by a coupon provider 16, the IODS 1 will inform the consumer/user 13 on the reason for rejecting 17 the application, and will also be prompted 18 to contact a representative via e-mail or other means for assistance. After the IODS 1 determines that there are no problem with the consumer/user prescreening qualification, the IODS 1 will prompt the consumer/user to enter in 19 additional financial and directory information pertaining to the validation of a personal payment card, including but not limited to the type of payment card, expiration date, payment card number, first and last name, address and zip code, and telephone number. All forms and types of payment card are referred herein as credit card, the name commonly associated by a user for these types of payment. The IODS 1 will verify 20 the financial and directory information provided through the financial institution's database and permit only a specified number of accounts using a specific credit card number. If the IODS rejects 23 the creation of an account based on the additional information supplied, the IODS 1 will prompt the consumer/user of the reason for rejecting the application, and will advise the consumer/user to contact a representative via e-mail or other means for assistance. If the consumer/user is not comfortable in supplying credit card information online, or does not have a credit card, the consumer/user may elect to print out and fill-up an application form with all the requested information, and submit this to the provider 16 or the service center 22, along with a copy of a valid driver's license, and a copy of a current telephone statement. The above information may also be supplied through the telephone. The above information may also be supplied through the telephone. If there is no problem with the application as determined with the steps described above, the provider 16 or preferably service center 22 housing the IODS 1 manually or online creates an account for the consumer/user. The service center 22 approves the membership and notifies 24 the applicant via e-mail or through other forms of communication that his/her supplied unique user name is the same as his/her identification mark and will open an e-mail address with the same unique user name for the member user. For a purely manual registration application, an applicant will undergo the same process except that the information and feedback will be done through telephone, facsimile transmission or by mail.

B. Real Time Online Coupon Issuance and Redemption

Figure 3:
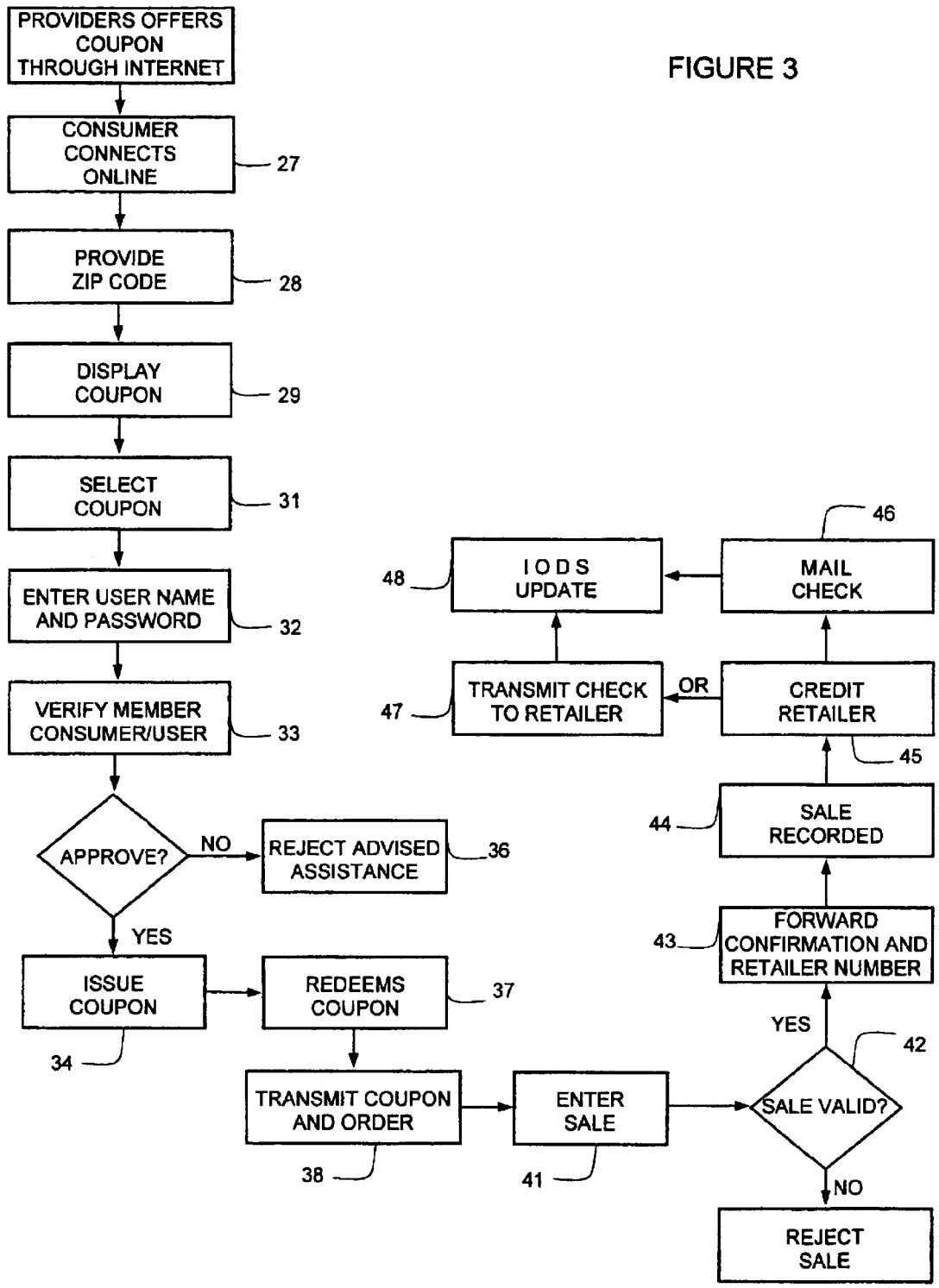
FIG. 3 is a schematic of a real time online coupon issuance, redemption and verification process.

A real time online method for coupon issuance and redemption as shown in FIG. 3 is herein described. A provider 16, desiring to issue product coupons 25, either independently or through the aid of a service center 22, makes a certain number of coupon available to the consuming market. Product manufacturer and Service Provider 16 provides industry data including and not limited to coupon redemption value, product image, offer code, begin promotional date, expiration date, coupon barcode, maximum number of coupon to be issued/printed per geographical zone (DMA) and instruction relating to the use of the coupon independently or preferably to a service center 22 also herein referred to as coupon issuer. These data will be inputed into an interactive online database (IODS) system 1, and after an online or manual verification of the inputed data by the administrator 10, the IODS 1 will display coupons from the providers 16 to the member consumer/users 26 through the Internet.

The process starts with a member consumer/user 26 connecting 27 online to the IODS 1, and providing 28 a resident zip code number. The system 1 will display 29 the available coupons on the screen of the member/user 6 terminal. Member/user represents both consumer and retailer while consumer/user pertains only to the consumer and not the retailer. Member consumer/user is a consumer/user who was approved for membership. The member consumer/user will be prompted to select 31 a coupon 25 from the display of a selection of coupons based on their geographical location. The display will also indicate the number of coupons available for selection by the member consumer/user. A registered member of the IODS enters 32 his/her user name also referred to as assigned identification mark and password for verification 33 by the IODS 1. Once verified for its validity, the IODS 1 will issue 34 a unique coupon 25 preferably with an encrypted serial number to the member consumer/user's remote user computer terminal 6. A valid user name and password mean that the IODS 1 has checked its database and verified the client assigned identification mark and password, tied the assigned identification mark to the member consumer/user, and that the user has not requested the same coupon at an earlier time. The member consumer/user may only obtain one unique coupon per product or service, as the IODS 1 will not issue a second unique coupon from the same provider's promotion for the same product or service to the same member consumer/user. The IODS 1 may also issue according to the provider's instructions, a designated number of provider's coupons for a household larger than two. In a paper printed coupon, the above steps are accomplished with the distribution of the providers' coupons through known marketing media. If the user name and/or password is not valid, the member consumer/user is advised by the IODS 1 to contact 36 the provider or service center representative. The member consumer/user redeems 37 the coupon online and transmits 38 the provider coupon to a retailer remote terminal or computer 39 along with an order for the product before the printed expiration date. At the retail store's terminal or computer 39 the retailer/user 40 (not shown) enters 41 a sale or a plurality of sale and communicates the sale to the financial institution for validation and approval 42. Once approved by the financial institution, the latter prints out online at the retailer's terminal 39, a confirmation number which is forwarded 43 online to the IODS 1 at either the provider or service center site by the retailer/user along with his/her retailer/user identification number. The IODS 1 records 44 online, the sale on the retailer/user' account held at the service center or provider and immediately credits 45 the retailer/user with the corresponding amount indicated on the provider's coupon. After a period indicated by the provider or service center, the IODS 1 reimburses the retailer/user by printing 46 out a check for the outstanding amount of credit due to the retailer/user and mailing this or transmitting 47 a check to the retailer/user terminal which the retailer/user can print at his/her terminal. After reimbursement, the IODS 1 updates 48 its records. All these activities are stored in the IODS 1. Maintenance of this record is on real time interactivity, meaning, the data or information is immediately entered and modified after every credit and reimbursement.

A purely online process may not be feasible for some retailers with less sophisticated terminals and network connection such that some form of a hybrid process is resorted to.

C. Hybrid Coupon Issuance and Redemption

The initial steps of the process is the same as the real time online process described above. The numbering of the same steps will be maintained so that those steps that differ will be differentiated by the use of a different number.

Figure 4:
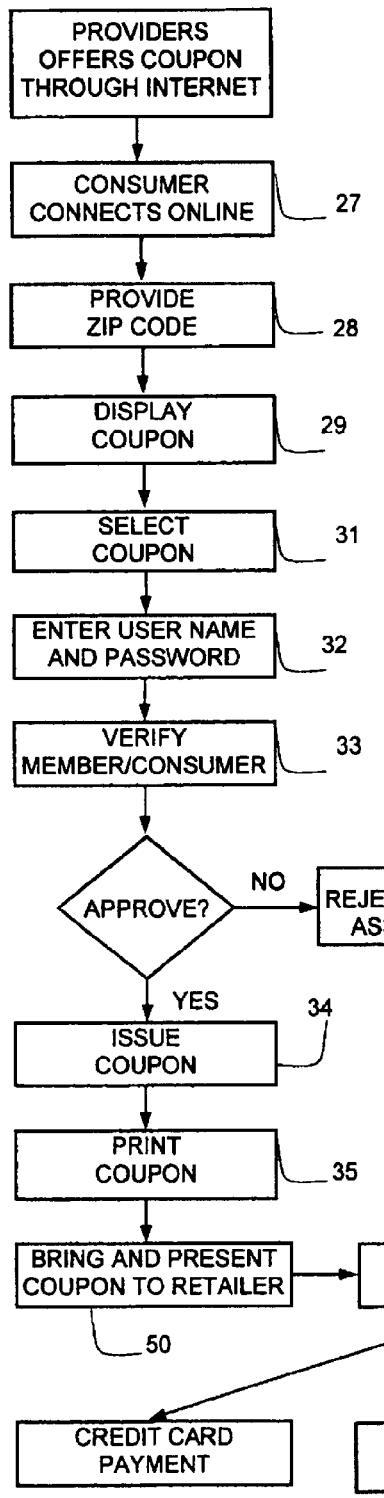
FIG. 4 is a schematic of a hybrid process for the issuance, redemption and verification of a coupon.

The process as shown in FIG. 4, starts with a member consumer/user 26 connecting 27 online to the IODS 1, and providing 28 a resident zip code number. The system 1 will display 29 the available provider coupons on the screen of the member/user 6 terminal. The member consumer/user will be prompted to a select 31 a provider coupon 25 from the display of a selection of coupons based on their geographical location. The display will also indicate the number of coupons available for selection by the member consumer/user. A registered member of the IODS enters 32 his/her user name also referred to as assigned identification mark and password for verification 33 by the IODS 1. Once verified for its validity, the IODS 1 will issue 34 a unique coupon 25 preferably with an encrypted serial number to the member consumer/user's remote user computer terminal 6, so that the coupon 25 may be printed 35 immediately or retrieved a second time from the service center 22, if the original printed coupon was lost or damaged, and printed on the member consumer/user's printer device 49 (not shown). The service center will issue a substitute identical coupon as the original for lost or damaged coupon to enable traceability if the member consumer/user has used the original coupon because the duplicate usage will be identified and detected once the original and the subtitute coupons are scanned. Validity criteria are the same as the above real time online process. In a paper printed coupon, the above steps are accomplished with the distribution of the providers' coupons through known marketing media. If the user name and/or password is not valid, the member consumer/user is advised by the IODS 1 to contact 36 the provider or service center representative. The member consumer/user brings the provider coupon 25 to a retailer/user 40 and upon presentation 50 of the coupon 25 for a card payment, the retailer matches the name in the coupon with the name on the credit card, bank check or any other valid form of identification, punches in or enter 51 the amount of the sale and requests the user to make his/her payment by sliding his/her credit card for payment validation by the card provider. For payment by a bank check, the check is validated by a member consumer/user presenting a picture identification such as a valid driver's license to the retailer/user and by writing 52 the bank account and/or check number on the provider's coupon 25. The check number written on the coupon will be the retailer's proof of the purchase. The retailer/user 40 gathers 53 all the validated provider coupons 25 received, and forwards 54 these by mail or shipment with his retailer identification number or other forms of identification to the provider 16 or service center 22 whose address is printed on the coupon, or to a selected retail clearing house selected by the retail store to sort and ship 54 these coupons 25 for them. The coupon 25 must be returned to the provider or the appropriate service center 22 for coupon scanning, decoding, and validation. Upon acceptance by the provider or service center 22, The IODS 1 will download 55 the most recent copy of the coupon database and activity into a scanning system 9 which will scan, decode, validate and record 56 each coupon 25, the good coupons will be counted 58 and any coupons that were tampered, falsely created, or photocopied will be identified and recorded 59. After completion of every submission, accounting and verification of all coupons submitted by a retailer, the IODS 1 database is updated. The latest retailer redemption activity will be documented 60 in a coupon validation report. The coupon validation report, along with the physical coupon received by the service center if used by the provider, will be forwarded 61 to the provider or its agent who will review 62 the coupon validation report and reimburse 63 the retail store for the member consumer/user submitted coupons. For any anomalies, the provider may choose to audit 64 the retail store for potential coupon fraud. This audit trail, made possible by using an IODS, allow the product and service providers to isolate the cause of fraud, and therefore deter and reduce future coupon fraud by the users. Because the systems described above can quantify, deter and reduce fraud, the business risk brought about by the fraudulent practices seen in a coupon promotion is likewise reduced or deterred, thereby making an insurance company more open to insuring or covering such businesses and/or practices.

In the above processes, the retailer can also be the consumer, if allowed by the provider. In the real time online process, the same assigned identification mark or user name is entered both for the issuance of the coupon and credit of the coupon amount which the provider later reimburses.

D. Provider's Coupon

Figure 5:
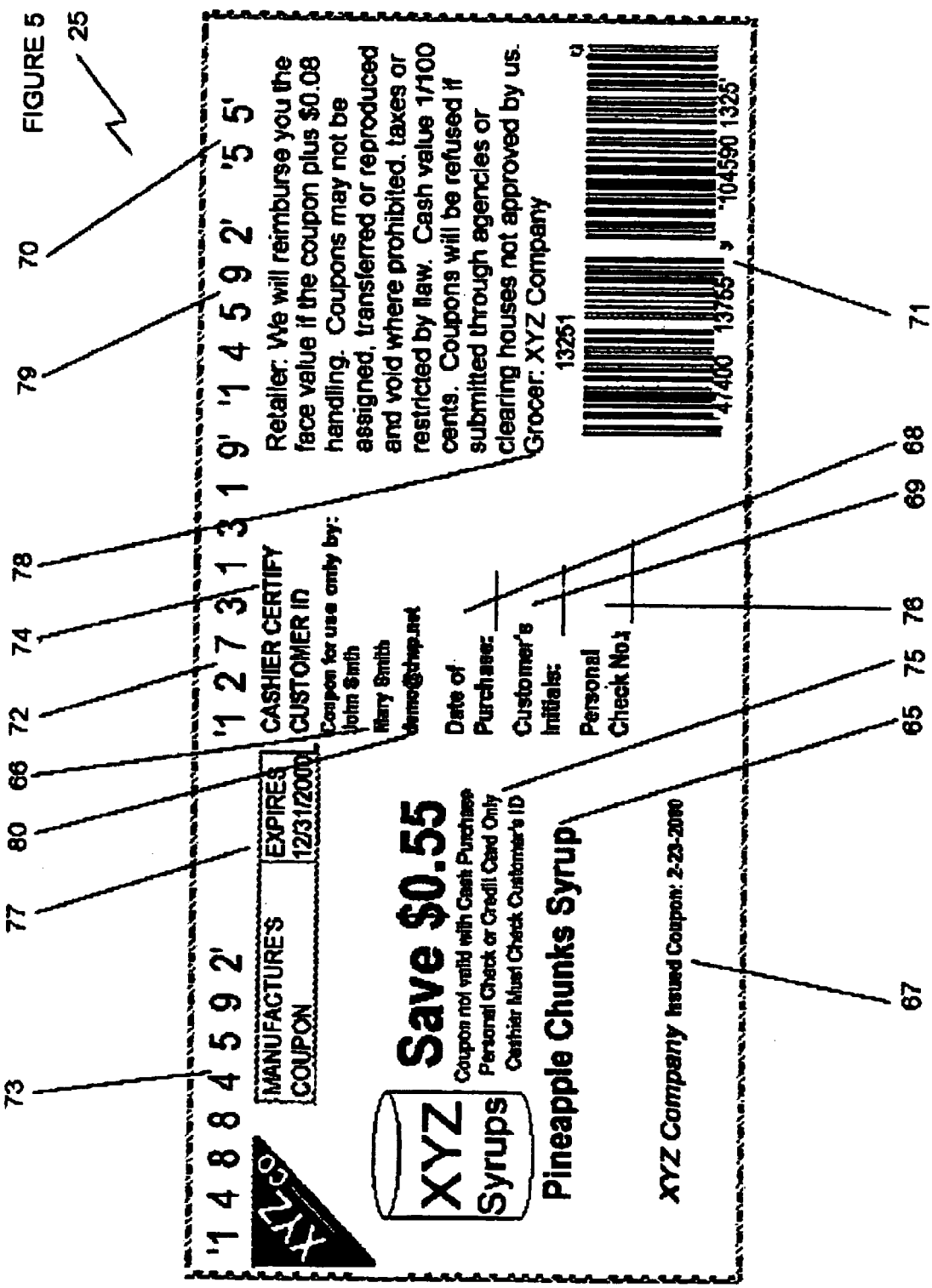
FIG. 5 is an example of a provider's coupon.

While current printed and electronic coupons 82 (not shown) may be adapted to the security systems of the claimed invention, a preferred provider's coupon 25 as shown in FIG. 5 contains aside from the product information 65, the following information: name of the user 66 and name of spouse, if requested, date of printing or issuance 67 a blank space to fill in date of purchase 68, a blank space to write in the initial of the member consumer 69, coupon value 70, barcode 71, unique encrypted serial number 72, unique membership identification number 73, instruction to cashier to check identification 74, and to accept purchases only with a credit card payment method or by personal bank check 75, a blank space 76 where the member consumer/user writes in his/her account and or check number, coupon expiration date 77, mailing address for redemption of coupon 78, sales order number of the promotion 79 and the e-mail address 80 issued to the member/user upon registration.

For electronic coupons, all of the preferred information above can be easily printed on the provider's coupon much like a personal check. For third party coupons without the above printed information on the coupon, these may be adapted to the claimed system and used by separately entering or punching in the same requested membership information to the IODS 1 with the IODS 1 imprinting the supplied information on the third party coupon 82 once the sale is validated. This is done at the point of sale using the retailer's remote terminal 39, once a consumer/user agrees to sign up for membership which may be done from the retailer's terminal 39. The same membership application process as described above is followed. For a member/user using a third party coupon, the same steps are followed except that a member/user simply enters his/her user name and password on the retailer's remote terminal or computer 39 or on other devices at the retailer's premises such as an electric card programmer.

E. Fraud Deterrent Process for Third Party Coupon

Figure 6:
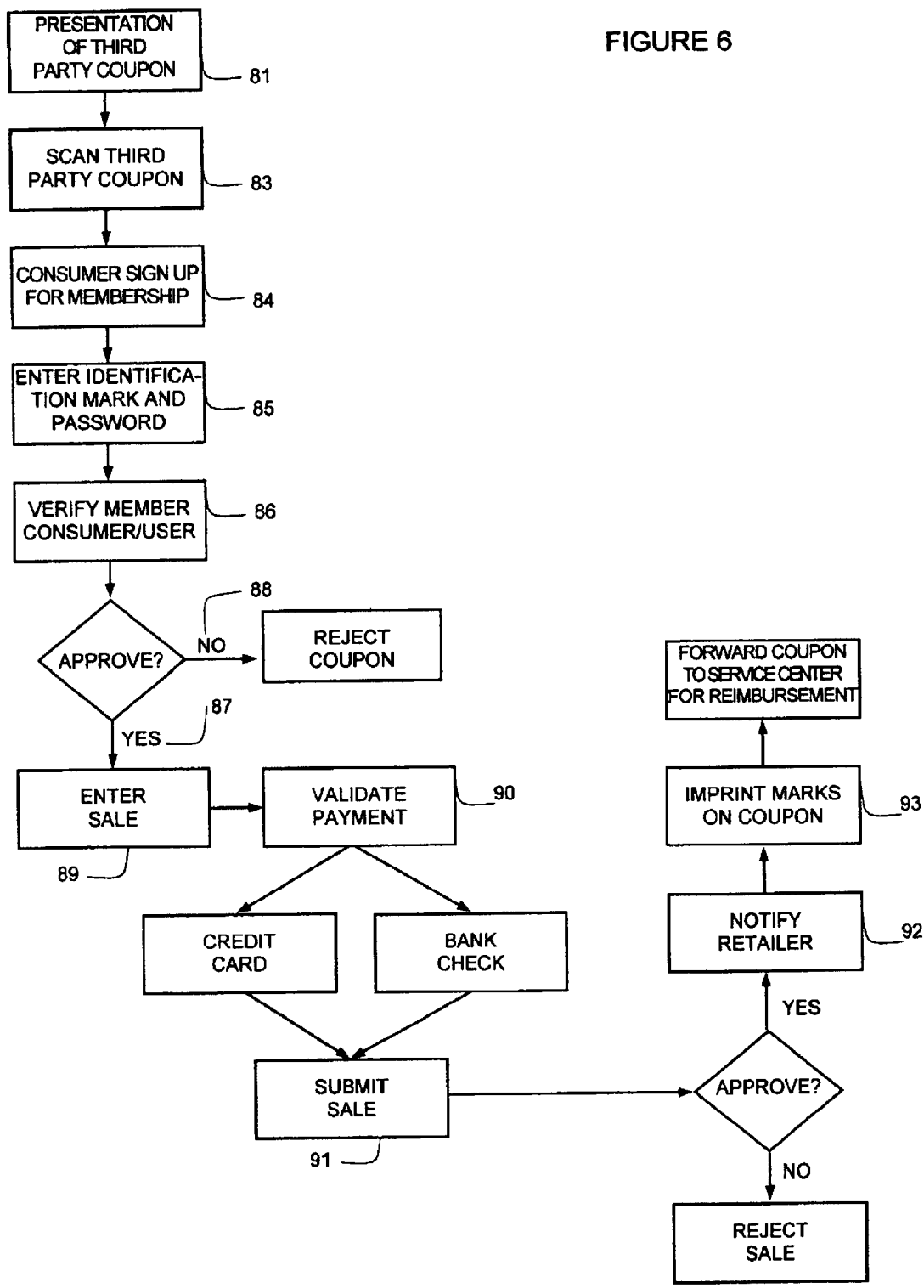
FIG. 6 is a schematic of a process for adapting a fraud deterrent measure into a third party coupon.

For current traditional paper printed and/or online third party generated provider coupons, collectively referred to as third party coupon, the method of issuance and reimbursement of these coupons as shown in FIG. 6, starts with the presentation 81 of the third party coupon 82 to a retailer. The retailer scans 83 the coupon for validity and if the consumer/user desires to use the coupon, he/she is allowed to do so if he/she agrees to sign up 84 for membership or if he/she is already a member. The membership process is the same as that described in A above. If membership is approved, the service center allows the member consumer/user 26 to immediately start using the assigned identification mark or user name with his/her password. As in the process above, the member consumer/user enters 85 the assigned identification mark and his/her consumer/user password into an interactive online database system, IODS 1 of a service center or a provider, the IODS 1 checking its database to verify 86 the assigned identification mark and password. The IODS 1 verifies the member consumer/user by tying the assigned mark and password to the member consumer/user. The IODS 1 approves 87 or disapproves 88 the use of the third party coupon by the member consumer/user. Once the member consumer/user is approved, the sale or sales of the product is entered 89 by the retailer who then validates 90 the payment of the sale by a credit card or a personal bank check by first matching the user name on the coupon with the name on the credit card or personal bank check and submitting 91 the sale to the respective financial institutions who will notify 92 the retailer either on line or through the phone whether the payment is good. When the payment is honored, the retailer imprints 93 the service center certificate and identification marks on the surface of the third party coupon. From this step, the process proceeds as in step C above, from the step commencing with the gathering and forwarding of the coupon to the service center 22, but in this case imprinted third party coupons 82 instead of the preferred provider coupon 25 are submitted for reimbursement.

While the embodiments of the present invention have been described, it should be understood that various changes, adaptations, and modifications may be made therein without departing from the spirit of the invention and the scope of the claims.

We claim:

1. A method to deter consumer/user and retailer fraud on an online coupon having a unique identification mark issued from a coupon issuance and redemption program to a registered or member consumer/user to deter or prevent unauthorized copying, counterfeiting, tampering, creation and multiple redemption of the coupon, comprising the steps of:
   a) entering a resident zip code by a member consumer/user to an interactive online database system of a service center or a provider;
   b) displaying available provider coupons for the member consumer/user by a provider through the interactive online database system;
   c) selecting a provider coupon or coupons from the available coupons by the member consumer/user;
   d) entering an assigned identification mark or user name and a member consumer/user password into the interactive online database, the interactive online database checking its database to verify the assigned identification mark and password, tying the assigned identification mark and password to the member consumer/user, determining a number of times the member consumer/user has requested the provider coupon, approving or disapproving the member consumer/user and allowing the issuance of the provider coupon, the issued coupon tied to the member consumer/user identification mark and password;
   e) printing the provider coupon by the member consumer/user, the printed provider coupon having printed on the coupon aside from typical certification mark and identification mark, at least the member consumer/user's name, an instruction to cashier to check identification and to accept purchases only with a credit card payment method or by personal bank check and if paid by personal bank check, a blank space to fill in date of purchase, a blank space for the member consumer/user to write in his/her initial and a blank space to write in a check number or a bank account number or both;
   f) bringing and presenting the provider coupon by the member consumer/user to a retailer;
   g) matching the imprinted name on the coupon with the name on the credit card or the personal bank check used for payment;
   h) entering a sale or a plurality of sale of a product by the retailer only if payment is made by credit card or a personal bank check;
   i) validating payment of the sale by credit card or personal bank check, the payment by personal bank check validated by a picture identification and writing in the bank account and check number or either one of these on the provider's coupon;
   j) forwarding a number of gathered validated provider coupons generated from the sale or plurality of sale of the product to a service center;
   k) scanning, decoding and validating the provider coupons forwarded by the retailer;
   l) identifying fraudulent coupons from legitimate coupons;
   m) preparing a provider coupon validation report by the service center;
   n) forwarding the coupon validation report and the gathered validated provider coupon to the provider;
   o) reviewing the coupon validation report by the provider;
   p) reimbursing the retailer for the amount of the desired coupons, and,
   q) updating the interactive online database after each reimbursement of the retailer.

2. The method of claim 1 further comprising the step of auditing the retailer for potential coupon fraud.

3. The method of claim 1 wherein the provider coupon may be retrieved a second time from the service center for printing if an original printed provider coupon was lost or damaged.

4. The method of claim 1 wherein the current information written on the provider coupon includes a product information, date of issuance or printing of the provider coupon, the provider coupon value, expiration date, sales order number, provider's barcode, and a mailing address of a service center or provider where a retailer can submit used member consumer/user provider coupons for reimbursement.

5. The method of claim 1 wherein the information written on the provider coupon further includes an e-mail address.

6. The method of claim 1 wherein the information written on the provider coupon further includes a member consumer/user spouse's name.

7. The method of claim 1 wherein the information written on the provider coupon further includes a unique encrypted serial number.

8. The method of claim 1 wherein the consumer/user registers for membership to the coupon issuance and redemption program by a method comprising:

(a) entering a prescreening information, the prescreening information comprising a unique user name, a password and any other information requested by a service center or a provider to an interactive online database system;

(b) verifying the uniqueness of the prescreening information and informing the consumer/user if the prescreening information is acceptable;

(c) requesting the consumer/user to enter a new prescreening information if the entered prescreening name is not acceptable;

(d) repeating steps (b) and (c) until the entered prescreening information is acceptable;

(e) entering financial and directory information to the interactive online database system by the consumer/user; and, (f) determining existing number of financial accounts listed under the consumer/user, approving or disapproving membership of the consumer/user as a member consumer/user, notifying an approved member consumer/user to use the accepted prescreening unique user name and password for accessing the interactive online database system by the service center or provider.

9. The method of claim 1 wherein the registration is done online or submitted in a written application form.

10. The method of claim 1 wherein the number of financial account listed under a member consumer/user may be limited by the provider.

* * * * *